United States Patent
Turullols et al.

(10) Patent No.: US 10,768,057 B2
(45) Date of Patent: Sep. 8, 2020

(54) STATISTICAL TEMPERATURE SENSOR CALIBRATION APPARATUS AND METHODOLOGY

(71) Applicant: Oracle International Corporation, Redwood City, CA (US)

(72) Inventors: Sebastian Turullols, Los Altos, CA (US); Ha Pham, San Jose, CA (US); Changku Hwang, Morgan Hill, CA (US); Yifan YangGong, Milpitas, CA (US); Qing Xie, Sunnyvale, CA (US)

(73) Assignee: Oracle International Corporation, Redwood Shores, CA (US)

(*) Notice: Subject to any disclaimer, the term of this patent is extended or adjusted under 35 U.S.C. 154(b) by 327 days.

(21) Appl. No.: 15/695,883

(22) Filed: Sep. 5, 2017

(65) Prior Publication Data

US 2018/0283964 A1    Oct. 4, 2018

Related U.S. Application Data

(60) Provisional application No. 62/478,975, filed on Mar. 30, 2017.

(51) Int. Cl.
| | | |
|---|---|---|
| *G01K 7/00* | (2006.01) | |
| *G01K 1/00* | (2006.01) | |
| *G01K 15/00* | (2006.01) | |
| *G01K 7/01* | (2006.01) | |

(52) U.S. Cl.
CPC .............. *G01K 15/005* (2013.01); *G01K 7/01* (2013.01)

(58) Field of Classification Search
USPC ................................ 374/170, 163, 100, 178
See application file for complete search history.

(56) References Cited

U.S. PATENT DOCUMENTS

| | | | | |
|---|---|---|---|---|
| 5,134,398 A | * | 7/1992 | Yasutake ............... | H03M 1/089 341/119 |
| 5,493,906 A | * | 2/1996 | Sen-Zhi .................... | G01F 1/68 73/204.14 |
| 7,896,545 B2 | | 3/2011 | Pan | |
| 8,197,133 B2 | * | 6/2012 | Schultz ................. | G01F 1/6965 374/1 |
| 9,442,025 B2 | | 9/2016 | Yang et al. | |
| 9,804,036 B2 | | 10/2017 | Ma | |
| 9,959,810 B2 | * | 5/2018 | Kim ..................... | G09G 3/3233 |

* cited by examiner

*Primary Examiner* — Mirellys Jagan
(74) *Attorney, Agent, or Firm* — Kowert, Hood, Munyon, Rankin & Goetzel, P.C.; Erik A. Heter

(57) ABSTRACT

A method and apparatus for calibrating a temperature sensor is disclosed. In one embodiment, a method comprises generating first and second digital values based respectively on first and second voltages applied to a portion of a temperature sensor circuit. An arithmetic circuit may derive the value of the second voltage based on the first and second digital values. The method further comprises determining an initial value of a constant based on values of the first and second voltages, and determining a final value of the constant based on the initial voltage and at least one voltage offset. The constant may then be used in determining temperature readings for the temperature sensor.

20 Claims, 6 Drawing Sheets

STATISTICAL TEMPERATURE SENSOR CALIBRATION APPARATUS AND METHODOLOGY

PRIORITY INFORMATION

This application claims priority to U.S. provisional patent application Ser. No. 62/478,975, entitled "Statistical Temperature Sensor Calibration Apparatus and Methodology," filed Mar. 30, 2017, which is hereby incorporated by reference in its entirety as though fully and completely set forth herein.

BACKGROUND

Technical Field

This disclosure relates to integrated circuits, and more particularly, calibration of temperature sensors implemented in integrated circuits.

Description of the Related Art

Integrated circuits (ICs) often times include temperature sensors implemented thereon in order to monitor on-chip temperatures. The information received from temperatures sensors may be used in various ways, such as preventing overheating conditions, workload allocation, and so on.

As with any measuring circuit, temperature sensors may suffer inaccuracies from time to time. Accordingly, calibrations may be conducted on temperature sensors implemented in an IC, e.g., at periodic intervals. Calibration methodologies may vary widely from one type of sensor to another.

One type of temperature sensor used in ICs is known as a delta-Vbe sensor (or a silicon bandgap temperature sensor). Temperature sensed by a delta-Vbe sensor may be determined by voltages across, e.g., two different PN junctions (such as base-emitter junctions of corresponding bipolar transistors) and calculating temperature based on a difference between the voltages. Calibration of this type of sensor may be conducted by forcing a known temperature and then deriving a constant that, when used, results in a reading that matches the forced temperature.

SUMMARY

A method and apparatus for calibrating a temperature sensor is disclosed. In one embodiment, a method comprises generating first and second digital values based respectively on first and second voltages applied to a portion of a temperature sensor circuit. An arithmetic circuit may derive the value of the second voltage based on the first and second digital values. The method further comprises determining an initial value of a constant based on values of the first and second voltages, and determining a final value of the constant based on the initial voltage and at least one voltage offset. The constant may then be used in determining temperature readings for the temperature sensor.

In one embodiment, the temperature sensor is an analog temperature sensor that includes a bandgap circuit. The bandgap circuit includes first and second diodes, with the second diode being larger than the first. The diodes may be implemented in various ways, including actual diodes, using the PN junctions of bipolar transistors, etc. The temperature sensor also include analog-to-digital conversion (ADC) circuitry configured to receive voltages from the bandgap circuit, as well as the first and second voltages discussed above (wherein the first voltage is provided from a source external to the IC upon which the temperature sensor is implemented, while the second voltage is provided from a source internal to the IC). Arithmetic circuitry is coupled to receive the digital values from the ADC circuitry and perform the calculations to calibrate the temperature sensor and to obtain temperature readings therefrom.

The various method and apparatus embodiments may enable calibration of the temperature sensors without having to provide a known temperature. In some cases, forcing a known temperature may be difficult, if not impossible. However, providing a known voltage (e.g., the first voltage) may be significantly easier.

BRIEF DESCRIPTION OF THE DRAWINGS

The following detailed description makes reference to the accompanying drawings, which are now briefly described.

Figure 1:
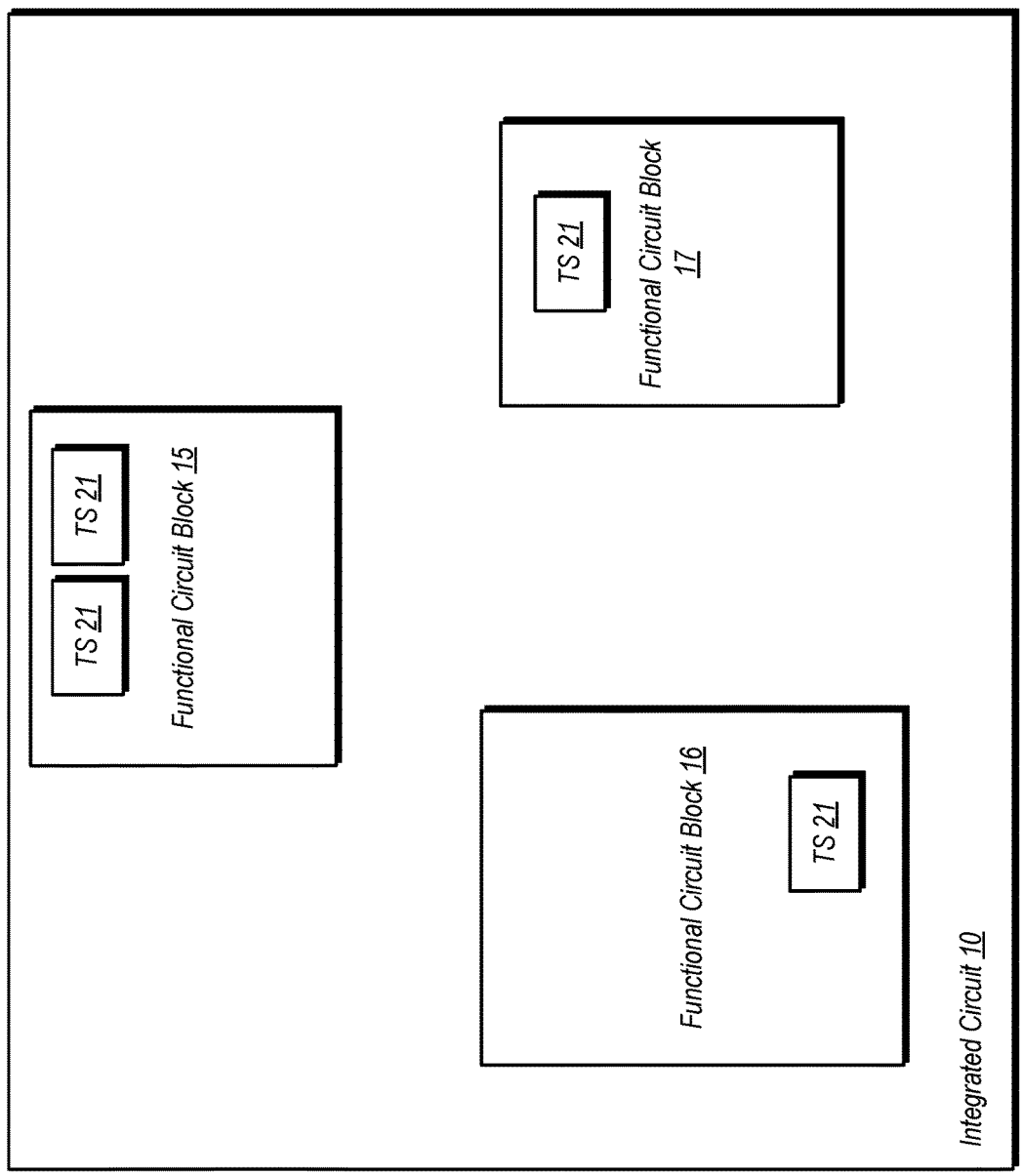
FIG. 1 is a diagram illustrating a physical layout of one embodiment of an integrated circuit (IC) having a number of temperature sensors implemented thereon.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Turning now to FIG. 1, a diagram illustrating one embodiment of an exemplary integrated circuit (IC) is shown. In the embodiment shown, IC 10 includes functional circuit blocks 15, 16, and 17. Each of the functional circuit blocks may perform various functions for IC 10. For example, one of the functional circuit blocks may be a processor core, another functional circuit block may be a memory controller, while another functional circuit block may be an interface unit. Generally speaking, IC 10 may be virtually any type of IC, and the functional circuit blocks (which may be greater or lesser in number than shown here) may perform corresponding functions of that IC.

Each of the functional circuit blocks shown in the embodiment of FIG. 1 include at least one temperature sensor 21. These temperature sensors 21 may provide temperature readings to other circuitry (not shown here for the sake of simplicity) that may perform various actions based on such readings. For example, IC 10 may include some kind of power/thermal management control circuitry that, upon receiving a temperature reading above a certain threshold, may reduce the workload of the corresponding functional circuit block to thereby manage its thermal output. More generally, temperature readings may provide information usable to determine a wide variety of actions in a given embodiment of an IC for controlling/managing power consumption and thermal output.

In the embodiment shown, temperature sensors 21 are analog temperature sensors. The temperatures may be sensed by these sensors based on voltages generated therein. In various embodiments, and as will be discussed below, temperature sensors 21 may include a bandgap circuit that generates voltage upon which temperature readings are determined.

Each of the temperature sensors 21 may undergo a calibration procedure prior to use. The calibration procedure may be performed prior to initial operation of the IC, and may also be performed at various intervals following thereafter. In this particular embodiment, the temperature sensors 21 are analog temperature sensors in which voltage readings are taken and a value based on the voltage readings is multiplied by a constant to arrive at the temperature reading. Calibration procedures may thus be performed to determine this constant value, and are discussed in further detail below.

It is noted that the calibration procedures may vary depending on the placement of the temperature sensors 21. As noted above, functional circuit block 16 and 17 each include a single instance of temperature sensor 21, while functional circuit block 15 includes two instances of temperature sensor 21 in close proximity to one another. For the temperature sensors implemented singly (e.g., such as in functional circuit blocks 16 and 17) may be calibrated as single entities. In contrast, the calibration of temperature sensors 21 of functional circuit block 15 may be calibrated together, with voltage readings from each of the temperature sensors 21 being factored into calibration of the counterpart temperature sensor 21.

Figure 2:
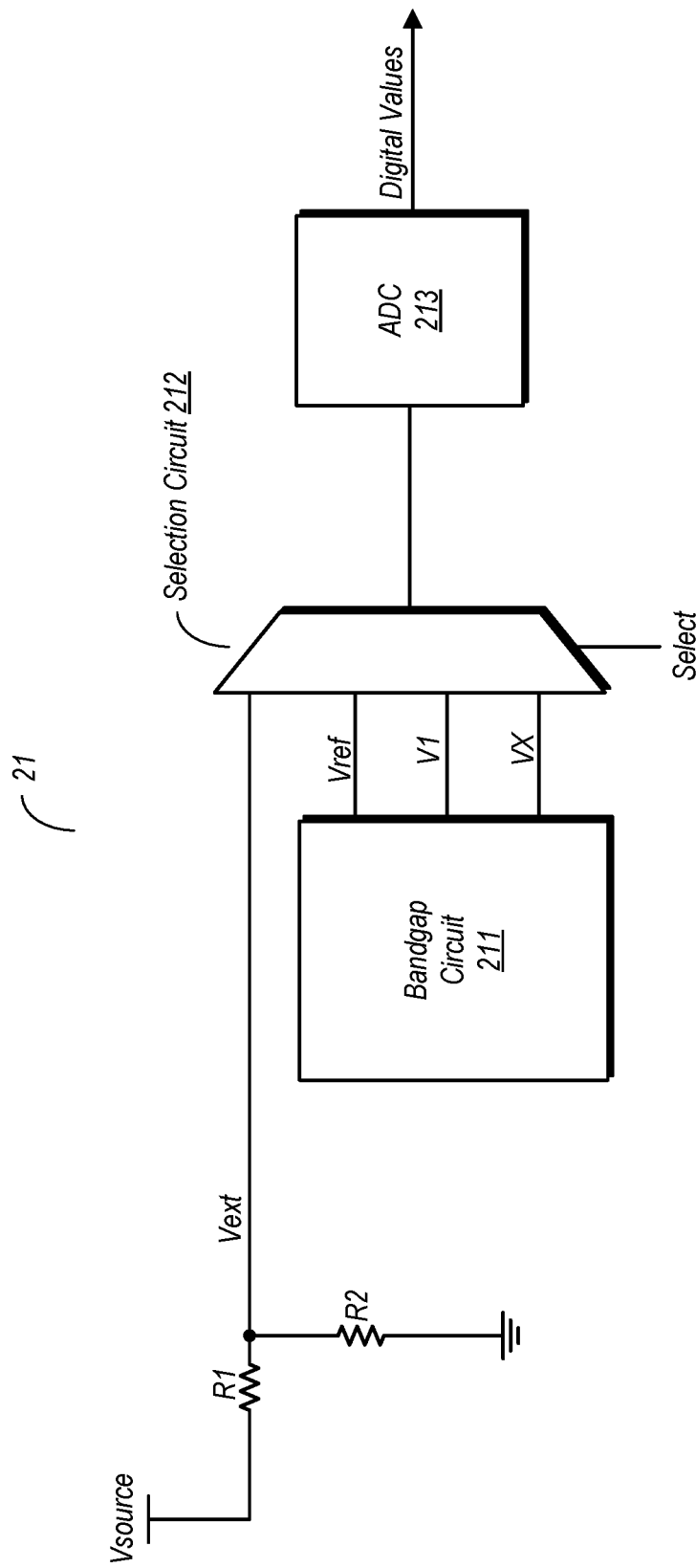
FIG. 2 is a block diagram of one embodiment of a temperature sensor and associated circuitry.

FIG. 2 is a diagram illustrating a basic architecture for one embodiment of a temperature sensor 21. In the embodiment shown, temperature sensor 21 includes a bandgap circuit 211, a selection circuit 212, and an analog-to-digital converter (ADC) 213. Selection circuit 21 in the embodiment shown is coupled to provide one of four selected voltages to ADC 213. One of the voltages, Vext, is a voltage that is provided from an external voltage supply, Vsource. The voltage Vext may be a known voltage provided from the voltage divider implemented by resistors R1 and R2. The voltage supply Vsource may be, e.g., a precision analog voltage supply in which the voltage is carefully controlled.

Bandgap circuit 211 is coupled to provide three different voltages to corresponding inputs of selection circuit 211. A first of these voltages is a reference voltage, Vref. The reference voltage may be, e.g., a supply voltage provided to the bandgap circuit, and in which the precise value of which is unknown prior to calibration. Voltages V1 and VX may be provided from diode (e.g., PN) junctions in bandgap circuit 211. More particular, V1 may be provided from a first diode junction, while VX may be provided from a second diode junction. The second diode junction may be X times larger (e.g., 15 times) than the first diode junction. This may result in different voltage drops across the diode junctions. A temperature measurement may be determined based on the difference between the two voltage drops.

The voltage on the selected input of selection circuit 212 may be provided to ADC 213. From there, the voltage may be converted into a digital value and provided to arithmetic circuitry for further processing. During calibration, the external voltage Vext and the reference voltage Vref may be provided to ADC 213 for conversion into corresponding digital values during the calibration processes. During the taking of a temperature reading, voltages V1 and VX may be provided to ADC 213 for conversion into corresponding digital values.

Figure 3:
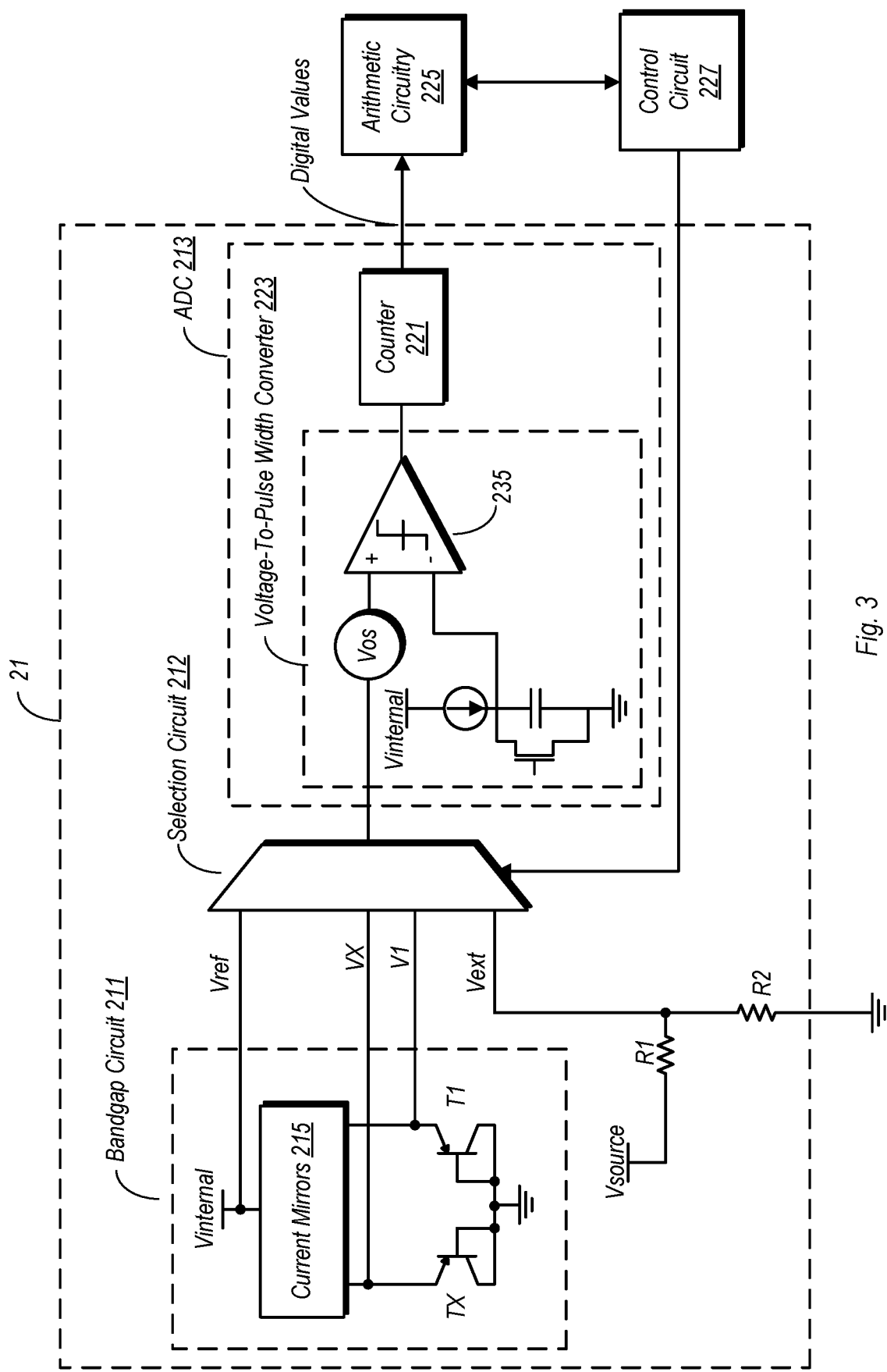
FIG. 3 is a diagram illustrating details of one embodiment of a temperature sensor.

FIG. 3 is a diagram illustrating one embodiment of a temperature sensor 21 with additional details. In the embodiment shown, temperature sensor 21 conforms to the basic architecture of the temperature sensor 21 shown in FIG. 2. It is noted however, that other embodiments are possible and contemplated within that architecture, and thus the embodiment of FIG. 3 is not intended to be limiting for the embodiment of FIG. 2. Instead, the embodiment of FIG. 3 is but one of many possible implementations of the temperature sensor 21 shown in FIG. 2. Other temperature sensor embodiments that do not fall within the scope of FIG. 2 are possible and contemplated, and thus the various embodiment of a calibration methodology discussed below may apply thereto.

In the embodiment shown, bandgap circuit 211 includes two bipolar transistors, T1 and TX, which implement the diode junctions of the same. In this particular embodiment, the transistors are PNP transistors. Embodiments in which diode junctions are implemented with NPN transistors or other types of PN junctions (e.g., actual diodes) are also possible and contemplated. Transistors T1 and TX may each receive current on their respective emitter terminals from current mirrors 215. The supply voltage for current mirrors 215 in this embodiment is received from the voltage node Vinternal. The voltage on this node may also be provided as the reference voltage. While the voltage supplied to Vinternal (e.g, such as Vsource) may be known, various factors such as IR drops between the actual source and Vinternal may be unknown. Thus, the value of the reference voltage, Vref, may be unknown prior to calibration. During calibration, the value of the reference voltage may be determined and thus used as a basis for arriving at a value of a constant.

In the embodiment shown, the voltages V1 and VX may be taken from the emitters of T1 and TX, respectively. The values of these voltages at any given time may be dependent on the amount of current flowing through their respective nodes, which in turn may have a dependence on the size of the respectively coupled diode junction. Thus, the respective currents to T1 and TX, and thus the respective voltages V1 and VX, may be different for the same conditions. This difference may be used in determining a reading of a temperature sensed by temperature sensor 21.

ADC 213 in the embodiment shown is implemented in this particular embodiment with voltage-to-pulse width converter (VPWC) 223 and counter 221. Depending on the voltage received from selection circuit 212, VPWC 223 may generate a pulse, with the width thereof being dependent on the received voltage. The pulse may be output from amplifier 235 to counter 221. Responsive to receiving a pulse, counter 221 may generate a count value that is proportional to the width of the received pulse. The count value is thus provided as a digital value that corresponds to the voltage output from selection circuit 212.

VPWC includes an offset voltage Vos that may be inherent. In calibrating the temperature sensor 21, this offset voltage may be accounted for in order to increase overall accuracy. This offset voltage may be unknown at the beginning of the calibration, and may thus be determined during the performance thereof. Once the offset voltage is determined, its value may be used to adjust an initial value of the constant noted above in order to arrive at a final, more accurate value.

The output from ADC 213 may be provided to arithmetic circuitry 225. In one embodiment, arithmetic circuitry 225 may be implemented separately from the other components of temperature sensor 21. For example, arithmetic circuitry 21 may in one embodiment be part of a power management or temperature management circuit that provides power and temperature management and control functions as discussed above. Moreover, multiple instances of temperature sensor 21 may be coupled to provide digital values to arithmetic circuitry 225. However, embodiments are possible and contemplated in which at least some instances of temperature sensor 21 include dedicated arithmetic circuitry.

Arithmetic circuitry 225 may perform various calculations used in determining the value of the constant during calibration, as well as for determining the temperature during normal operation. Control circuit 227 is coupled to arithmetic circuitry 225 to facilitate communications between these units during operation. As with arithmetic circuit 225, control circuit 227 may be implemented separately from temperature sensor 21, and may be part of a power management unit or other type of circuitry. However, embodiments wherein at least some of the temperature sensors 21 include a dedicated control circuit 227 are possible and contemplated.

Control circuit 227 in the embodiment shown is coupled to provide a selection signal to selection circuit 212. During calibration operations, control circuit 227 may select the external voltage, Vext, and the reference voltage, Vref. During temperature sensing operations, control circuit may select V1 and VX. Control circuit 227 may also indicate to arithmetic circuitry 225 which input is currently selected by selection circuit 212.

The calibration operation may now be described in further detail. During the initial portion of the calibration, two voltages are needed, the reference voltage Vref, and the external voltage, Vext. As previously noted, the reference voltage may be initially unknown, while the external voltage is known. However, the offset voltage, Vos is also unknown at the beginning of calibration. The external voltage and the reference voltage are each selected by selection circuit 212, under control of control circuit 227, and converted into digital values. Using the two digital values and the external voltage, the reference voltage can be derived. In particular, for the embodiment shown, the reference voltage can be determined by the following equation:

$$V_{ref} = V_{ext} \frac{N_{ref}}{N_{ext}}, \tag{1}$$

wherein $N_{ref}$ and $N_{ext}$ are the digital values corresponding to the reference voltage and external voltage, respectively.

Once the reference voltage has been determined, an initial value for a constant M can be determine. The constant M is a multiplication factor used in determining the temperature from a temperature reading. The initial value of M may be determine by Equation 2:

$$M_0 = \frac{q \cdot V_{ref}}{k \cdot \eta \cdot \ln(X)}, \tag{2}$$

wherein q is electron charge, k is Boltzman's constant, $\eta$ is the ideality factor of the diode junctions (provided by the manufacturer), and X is the ratio of the diode sizes (e.g., wherein the smaller diode=1). In an exemplary embodiment, in which X=15, Equation 2 may become the following:

$$M_0 = \frac{4285.193528}{\eta} \cdot \frac{N_{ref}}{N_{ext}} V_{ext}. \tag{3}$$

Once $M_0$ is calculated, the constant may then be adjusted for the offset voltage. The equation for the constant M, with the voltage offset factored in, can be written as:

$$M = \frac{q \cdot (V_{ref} + V_{os})}{k \cdot \eta \cdot \ln(X)}, \tag{4}$$

where $V_{os}$ is the offset voltage.

The initially unknown offset voltage may be determined, for a single sensor, using the following methodology. It is noted that in the example below, X=15, indicating that the larger of the two diode junctions is 15 times larger than the other. However, this example may be applied more generally by replacing '15' with another ratio of the larger diode junction to the smaller. It is further noted that the resistor values of R1 and R2 (of an embodiment of the temperature sensor shown in FIG. 3, to which this example applies) are 3 ohms and 6.5 ohms, respectively. Let:

$$I = \frac{c}{i_{ref}}, \tag{5}$$

$$V_{ext} = \frac{3(Vsource - IR)}{6.5}, \tag{6}$$

$$\bar{I} = \frac{\overline{N_{ext}}}{V_{ext}} = \frac{\frac{1}{16}\sum_{n=0}^{15} N_{ext_{ts\_n}}}{V_{ext}}, \tag{7}$$

$$\overline{V_1} = \frac{\overline{N_1}}{\bar{I}} = \frac{\frac{1}{16}\sum_{n=0}^{15} N_{1_{ts\_n}}}{\bar{I}} = V_{ext} \cdot \frac{\sum_{n=0}^{15} N_{1_{ts\_n}}}{\sum_{n=0}^{15} N_{ext_{ts\_n}}} \tag{8}$$

$$\overline{V_{15}} = \frac{\overline{N_{15}}}{\bar{I}} = \frac{\frac{1}{16}\sum_{n=0}^{15} N_{15_{ts\_n}}}{\bar{I}} = V_{ext} \cdot \frac{\sum_{n=0}^{15} N_{15_{ts\_n}}}{\sum_{n=0}^{15} N_{ext_{ts\_n}}}. \tag{9}$$

From the characterization of the diode junctions provided by the manufacturer for this particular example, we have the slopes of diode voltage drops Vbe1 and Vbe15, the IR drop, and the ideality:

$m_1$=−1.455 mV/° C.

$m_{15}$=−1.691 mV/° C.

IR=43 mV $\eta$=1.0078.

For a single temperature sensor, the above leads to a system of three equations with three unknowns, one of which is the offset voltage:

$$N_1 = I(\overline{V_1} + m_1 \Delta T + V_{os}) \tag{10}$$

$$N_{15} = I(\overline{V_{15}} m_{15} \Delta T + V_{os}) \tag{11}$$

$$N_{ext} = I(V_{ext} + V_{os}) \tag{12}$$

Solving the system of equations 10, 11, and 12 gives the following:

$$N_{os} = V_{os} I \tag{13}$$

Equation 13 may be solved for Vos, and this value may be inserted into equation (4) to obtain the final value of the constant M Alternatively, the final value of M may be found as follows:

$$M = M_0 \frac{N_{ref}}{(N_{ext} - N_{os})}. \tag{14}$$

With the final value of M obtained, the temperature sensor is calibrated. Using the constant M, the temperature can be determined for the embodiment discussed herein by the equation:

$$\text{Temperature} = M \frac{(N_1 - N_{15})}{N_{ref}}, \tag{15}$$

or, for the general embodiment:

$$\text{Temperature} = M \frac{(N_1 - N_X)}{N_{ref}}. \tag{16}$$

Equations 16 effectively states that the temperature equals a constant multiplied by a ratio of the difference between the diode drops over the reference voltage.

As previously noted, in instances where two separate temperature sensors are implemented in close physical proximity to one another, determination of their respective offset voltages may be performed in tandem to improve the accuracy of the calculations. Again, using the exemplary temperature sensor embodiment in which the larger diode junction is 15 times that of the smaller diode junction, we can begin determination of the respective offset voltages using equations 5 through 9 above. Additionally, for this particular embodiment, we can use the values of $m_1$, $m_{15}$, IR, and η given above. From this, we can obtain a system of six equations with six unknowns (with the respective voltage offsets of the sensors being two of the unknowns; $t_{sa}$ refers to a first temperature sensor, while $t_{sb}$ refers to the second):

$$N_{1_{tsA}} = I_{tsA}(\overline{V_1} + m_1\Delta T + V_{os_{tsA}} + \Delta b) \tag{17}$$

$$N_{15_{tsA}} = I_{tsA}(\overline{V_{15}} + m_{15}\Delta T + V_{os_{tsA}} + \Delta b) \tag{18}$$

$$N_{ext_{tsA}} = I_{tsA}(V_{ext} + T_{os_{tsA}}) \tag{19}$$

$$N_{1_{tsB}} = I_{tsB}(\overline{V_1} + m_1\Delta T + V_{os_{tsB}} + \Delta b) \tag{20}$$

$$N_{15_{tsB}} = I_{tsB}(\overline{V_{15}} + m_{15}\Delta T + V_{os_{tsB}} + \Delta b) \tag{21}$$

$$N_{ext_{tsB}} = I_{tsB}(V_{ext} + V_{os_{tsB}}) \tag{22}$$

From the above, we can calculate $N_{os}$ for each sensor using the corresponding value of $V_{os}$ and equation 13. These values can then be inserted into equivalents of equation 14 above to yield the constant for each of the adjacent temperature sensors:

$$M_{tsa} = M_0 \frac{N_{ref_{tsA}}}{(N_{ext_{tsA}} - N_{os_{tsA}})}, \tag{23}$$

$$M_{tsb} = M_0 \frac{N_{ref_{tsB}}}{(N_{ext_{tsB}} - N_{os_{tsB}})}. \tag{24}$$

Figure 4:
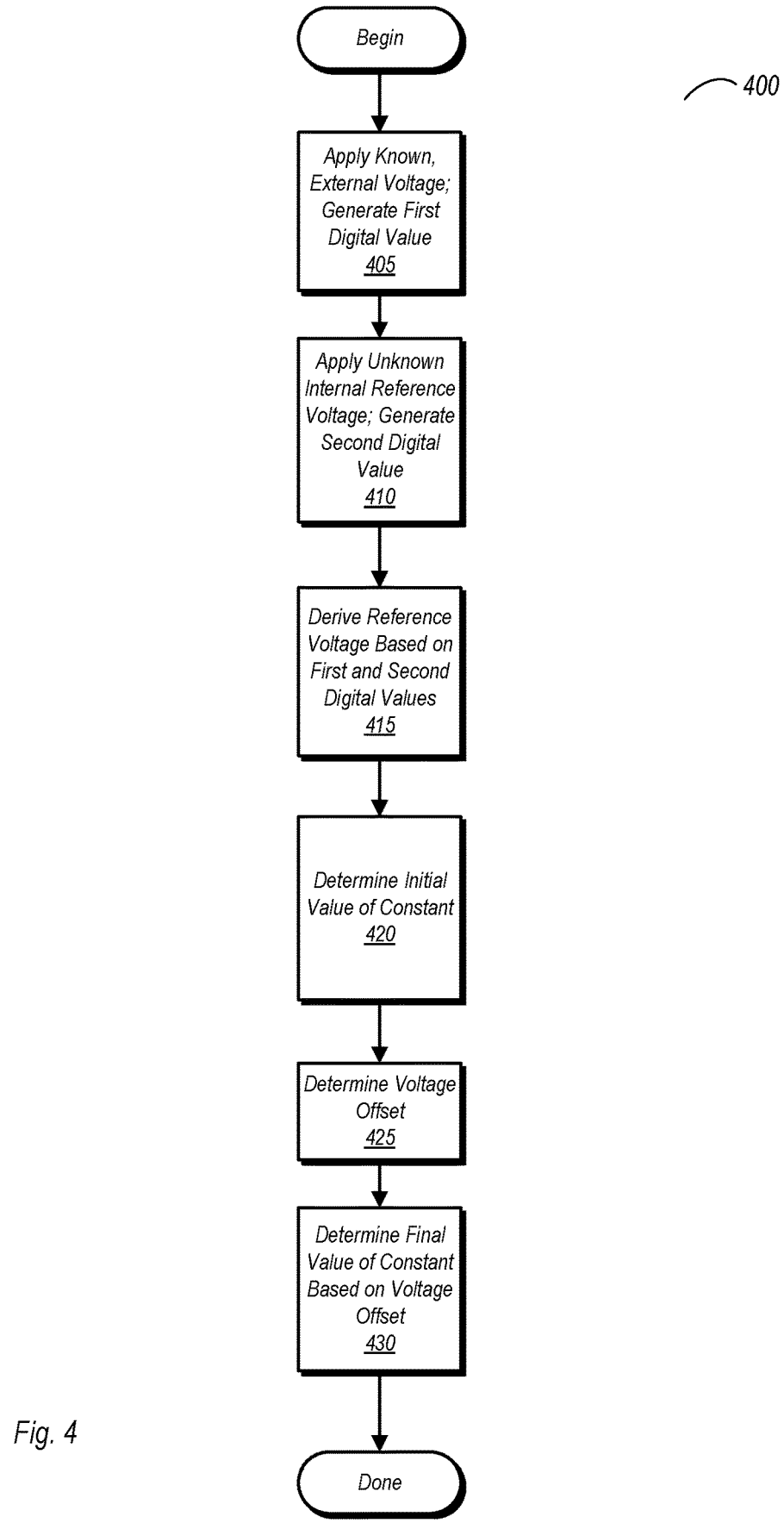
FIG. 4 is a flow diagram of one embodiment of a method for calibrating a single temperature sensor.
Figure 5:
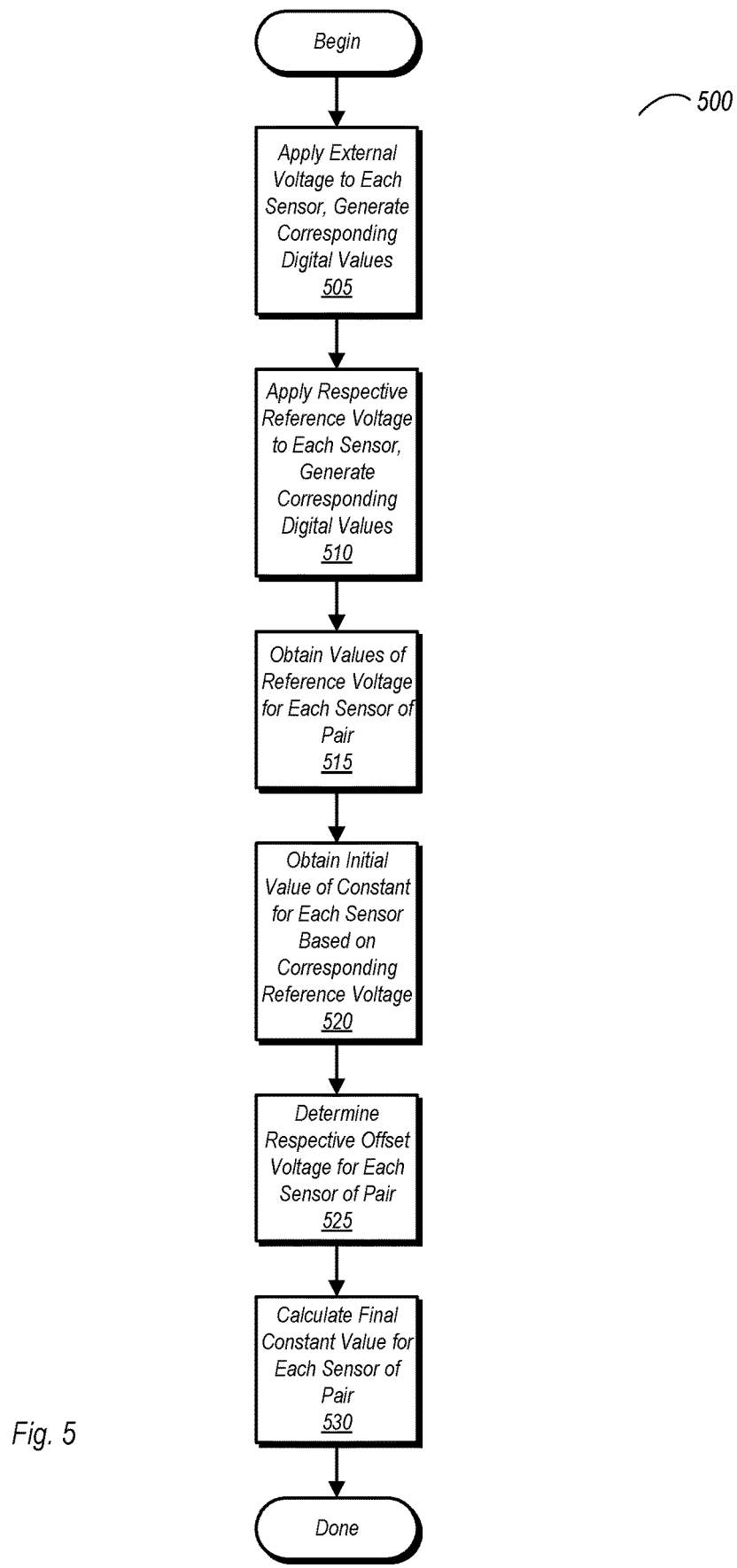
FIG. 5 is a flow diagram of one embodiment of a method for calibrating a pair of temperature sensors in close proximity to one another.

The various calibration methodologies discussed above may be summarized in the method embodiments of FIGS. 4 and 5. Methods 400 and 500, illustrated in FIGS. 4 and 5 respectively, may be performed for various embodiments of the sensors discussed above, and with various other portions of the hardware discussed above. It is possible and contemplated however that the calibration may be performed for other sensor embodiments and utilizing other hardware types as well. Such embodiments may thus fall within the scope of this disclosure. Furthermore, some of the calculations discussed above may be performed using software or firmware in various embodiments, which are also considered to fall within the scope of this disclosure.

Turning now to FIG. 4, a flow diagram of one embodiment of a method for calibrating a single temperature sensor is shown. Method 400 includes the applying of a known, external voltage to the temperature sensor and generating a corresponding, first digital value (block 405). The method further includes applying an unknown internal reference voltage and generating a second digital value based thereon (block 410). The order of these steps may vary from one embodiment to the next.

Having generated digital values for both the external voltage and the reference voltage, the reference voltage may be derived based on these digital values (block 415). Using equation 1 above, the ratio of the second digital value to the first digital value, multiplied by the known external voltage, results in the reference voltage.

Having determined the reference voltage, an initial value of the constant can be determined (block 420). In one embodiment, equation (2) as presented above may be used to determine the initial value of the constant.

Method 400 further includes determining a value of an initially unknown offset voltage (block 425), which in the embodiments above is present in VPWC 223. In one embodiment in which the offset voltage is determined for a single sensor, the various equations presented above may be used to determine the offset voltage for the sensor. After determining the offset voltage for the sensor, its value (or digital equivalent thereof) may be used to determine the final value of the constant (block 430). Referring to the equations above, either of equations (4) or (14) may be used to determine the final constant value based on the determined offset voltages. Having determined the final constant value for the temperature sensor, its calibration is complete.

FIG. 5 illustrates one embodiment of a method for calibrating two temperature sensors that are implemented in close physical proximity to one another (e.g., adjacent to one another). Method 500 includes the applying of a known, external voltage to each of the temperature sensors (block 505), and generating corresponding digital values. The method also includes applying to each temperature sensor a corresponding, unknown reference voltage, and generating digital values for each (block 510). Based on the generated digital values, the actual value of the reference voltage may be calculated for each temperature sensor (block 515). Having calculated the reference voltage for each of the two sensors, corresponding initial values of a constant for each are calculated (block 520).

Method 500 further includes determining offset voltages for each of the two sensors (block 525). For each of the sensors, the respectively determined offset voltages (or corresponding digital equivalents thereof) are applied to an appropriate equation to determine final constant values (block 530). Upon determining their respective final constant values, the calibration of the temperature sensors is complete.

Figure 6:
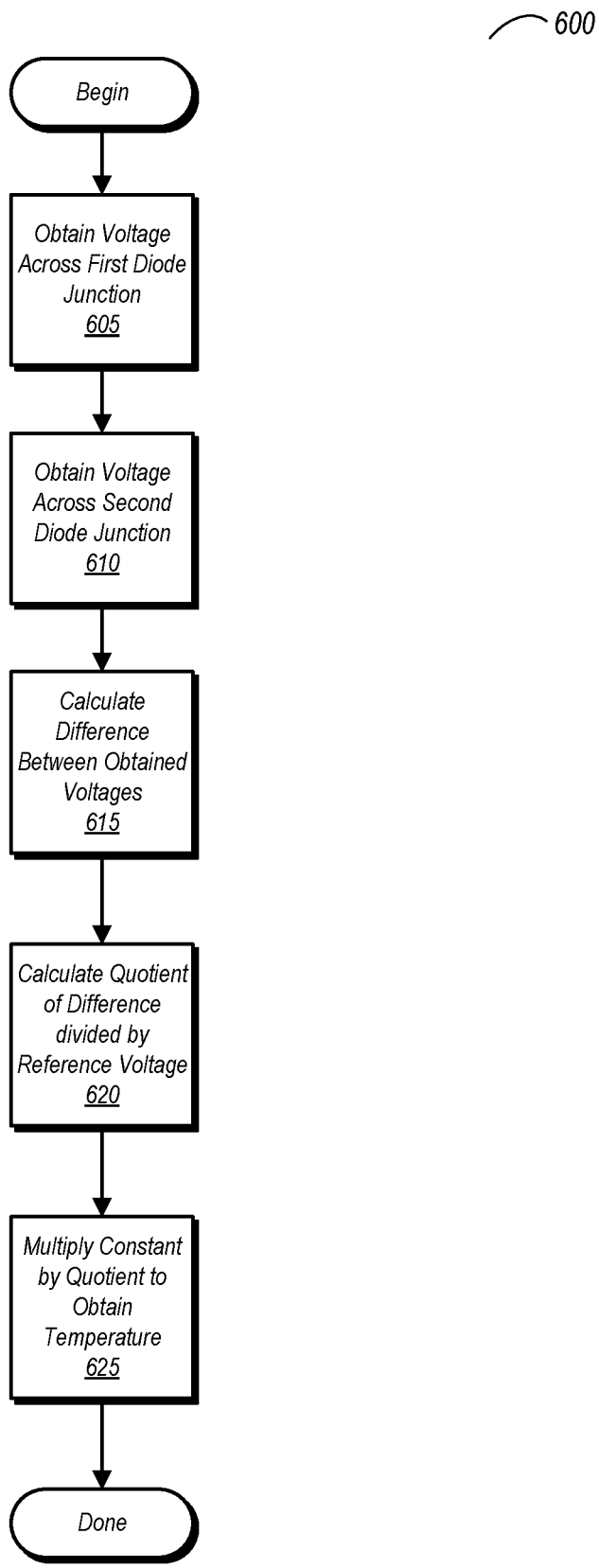
FIG. 6 is a flow diagram illustrating one embodiment of a method for determining a temperature reading from a temperature sensor.

FIG. 6 is a flow diagram illustrating one embodiment of a method for determining a temperature reading from a temperature sensor. Method 600 may be used to determine temperature readings for temperature sensors calibrated in accordance with the various calibration method discussed above.

Method 600 include obtaining voltages across first (block 605) and second (block 610) diode junctions of a bandgap circuit. The diode junctions may be of difference sizes, and may be implemented in different ways (e.g., by diodes, by PN junctions of a bipolar transistor, etc.). The voltage values obtained may also be converted into the digital domain for calculation purposes.

After obtaining the voltage values, a difference between the two is determined (block 615). This difference is then divided by the reference voltage (or equivalent digital value for calculations performed in the digital domain) to determine a quotient (block 620). The value of the sense temperature may then be determined by multiplying the quotient by the constant obtained in the calibration of the temperature sensor (block 625).

Numerous variations and modifications will become apparent to those skilled in the art once the above disclosure is fully appreciated. It is intended that the following claims be interpreted to embrace all such variations and modifications.

What is claimed is:

1. A method comprising:
    generating first and second digital values based respectively on first and second voltages applied to a portion of a first temperature sensor implemented on an integrated circuit (IC);
    deriving a value of the second voltage based on the first and second digital values;

determining an initial value of a constant based at least partly on the value of the second voltage derived from the first and second digital values;

determining a final value of the constant based on the initial value of the constant and at least one voltage offset that is separate from the first and second voltages; and subsequent to determining the final value, using the constant to calculate temperatures sensed by the first temperature sensor.

2. The method as recited in claim 1, further comprising:
determining the at least one voltage offset by solving a system of N equations with N unknown variables, wherein N is an integer value; and determining the final value of the constant by multiplying the initial value by a ratio of the value of the second voltage derived from the first and second digital values to a difference between the first voltage and the at least one voltage offset.

3. The method as recited in claim 1, wherein the value of the first voltage is a known voltage, and wherein the value of the second voltage is unknown prior to deriving.

4. The method as recited in claim 1, wherein the first voltage is provided from a source external to the IC, and wherein the second voltage is provided from a source internal to the IC.

5. The method as recited in claim 1, further comprising:
repeating said generating, said deriving, and said determining an initial value of a constant for a second temperature sensor implemented on the IC in close proximity to the first temperature sensor; and determining final values of corresponding constants for each of the first and second temperature sensors based on the at least one voltage offset, the at least one voltage offset being associated with the first temperature sensor, and a second voltage offset associated with the second temperature sensor.

6. The method as recited in claim 1, wherein deriving the value of the second voltage comprises multiplying the value of the first voltage by a ratio of the second digital value to the first digital value.

7. The method as recited in claim 1, further comprising an arithmetic circuit receiving the first and second digital values, deriving the value of the second voltage, and determining the initial and the final value of the constant.

8. The method as recited in claim 1, further comprising:
obtaining third and fourth digital values based on third and fourth voltages, respectively, wherein the third and fourth voltages are provided by a bandgap circuit of the temperature sensor.

9. The method as recited in claim 8, further comprising:
determining a difference between the third and fourth digital values;

determining a quotient of the difference divided by the second digital value; and determining a temperature reading by multiplying the final value of the constant by the quotient.

10. The method as recited in claim 8, further comprising:
the bandgap circuit generating the third voltage across a first diode junction; and the bandgap circuit generating the fourth voltage across a second diode junction;

wherein the second diode junction is larger than the first diode junction.

11. An integrated circuit (IC) comprising:
a selection circuit coupled to receive first, second, third, and fourth voltages on first, second, third, and fourth inputs, respectively;

a bandgap circuit coupled to provide the third and fourth voltages to the selection circuit;

analog-to-digital conversion circuitry configured to generate first, second, third and fourth digital values based on the first, second, third and fourth voltages, respectively, as received from the selection circuit; and arithmetic circuitry configured to:
derive a value of the second voltage based on the first and second digital values;

determine an initial value of a constant based on the second voltage;

determine a final value of the constant based on the initial value and a first voltage offset that is separate from the first and second voltages, the voltage offset being associated with a first temperature sensor that comprises the selection circuit, the bandgap circuit, and the analog-to-digital conversion circuitry; and subsequent to determining the final value of the constant, determine a temperature based on the third and fourth digital values and the final value of the constant.

12. The integrated circuit as recited in claim 11, wherein the first voltage is provided from a source external to the IC, wherein a value of the first voltage is known, wherein the value of the second voltage is unknown prior to being derived by the arithmetic circuit, and wherein the second voltage is provided from a source internal to the IC.

13. The integrated circuit as recited in claim 11, wherein the bandgap circuit includes a first diode junction configured to generate the first voltage and a second diode junction configured to generate the second voltage, wherein the second diode junction is larger than the first diode junction.

14. The integrated circuit as recited in claim 11, wherein the arithmetic circuit is configured to determine the temperature by:
calculating a difference between the third and fourth digital values;

calculating a quotient of the difference divided by the second digital value; and calculating the temperature by multiplying the final value of the constant by the quotient.

15. The integrated circuit as recited in claim 11, wherein the IC further includes a second temperature sensor that is substantially identical and in close proximity to the first temperature sensor, and wherein the arithmetic circuitry is further configured to:
determine a second voltage offset associated with the second temperature sensor; and determine the final value of the constant, for the first temperature sensor, and determine a final value of a constant for the second temperature sensor based on the first voltage offset and the second voltage offset.

16. The integrated circuit as recited in claim 11, further comprising a control circuit configured to generate selection signals applied to the selection circuit, wherein the control circuit is configured to cause selection of one of the first, second, third, or fourth inputs.

17. The integrated circuit as recited in claim 11, wherein the arithmetic circuit is configured to calculate the temperature by:
calculating a difference between the third and fourth digital values;

calculating a quotient of the difference divided by the second digital value; and calculating the temperature by multiplying the final value of the constant by the quotient.

18. A method comprising:

applying a first voltage to a portion of a first temperature sensor, wherein the first voltage is provided from a source external to an integrated circuit (IC) upon which the temperature sensor is implemented, and wherein a value of the first voltage is a known value;

applying a second voltage to the portion of the temperature sensor, wherein the second voltage is provided from a source on the IC, and wherein a value of the second voltage is initially unknown;

generating first and second digital values based on applying the first and second voltages, respectively;

deriving a value of the second voltage based on the first and second digital values;

calculating an initial value of a constant based on the value of the second voltage;

calculating a final value of the constant based on the initial value and at least one voltage offset that is separate from the first and second voltages; and subsequent to determining the final value, using the constant to calculate temperatures sensed by the first temperature sensor.

19. The method as recited in claim 18, further comprising:

obtaining, from a bandgap circuit, third and fourth digital values based on third and fourth voltages, respectively, wherein the third and fourth voltages are generated across first and second diode junctions of the bandgap circuit, and wherein the second diode junction is larger than the first diode junction;

calculating a difference between the third and fourth digital values;

calculating a quotient of the difference divided by the second digital value; and calculating a temperature value by multiplying the final value of the constant by the quotient.

20. The method as recited in claim 18, further comprising:

multiplying the value of the first voltage by a ratio of the second digital value to the first digital value to obtain the initial value of the constant;

determining the at least one voltage offset by solving a system of N equations with N unknown variables, wherein N is an integer value; and calculating the final value of the constant by multiplying the initial value of the constant by a ratio of the value of the second voltage to a difference between the first voltage and the at least one voltage offset.

\* \* \* \* \*

UNITED STATES PATENT AND TRADEMARK OFFICE
CERTIFICATE OF CORRECTION

PATENT NO. : 10,768,057 B2
APPLICATION NO. : 15/695883
DATED : September 8, 2020
INVENTOR(S) : Turullols et al.

Page 1 of 1

It is certified that error appears in the above-identified patent and that said Letters Patent is hereby corrected as shown below:

In the Specification

In Column 9, Line 11, delete "(18)" and insert -- (18), --, therefor.

In Column 9, Line 15, delete "$N_{1_{tsB}} = I_{tsB}(\overline{V_1} + m_1 \Delta T + V_{os_{tsB}} + \Delta b)$ (20)" and insert -- $N_{1_{tsB}} = I_{tsB}(\overline{V_1} + m_1 \Delta T + V_{os_{tsB}} - \Delta b)$ (20), --, therefor.

In Column 9, Line 17, delete "$N_{15_{tsB}} = I_{tsB}(\overline{V_{15}} + m_{15} \Delta T + V_{os_{tsB}} + \Delta b)$ (21)" and insert -- $N_{15_{tsB}} = I_{tsB}(\overline{V_{15}} + m_{15} \Delta T + V_{os_{tsB}} - \Delta b)$ (21), --, therefor.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*